(12) United States Patent
Shao et al.

(10) Patent No.: US 10,814,503 B2
(45) Date of Patent: Oct. 27, 2020

(54) HEAT DISSIPATING SYSTEM OF MOVABLE ROBOT

(71) Applicant: DELTA ELECTRONICS, INC., Taoyuan (TW)

(72) Inventors: Chi-Huan Shao, Taoyuan (TW); Chi-Shun Chang, Taoyuan (TW); Hung-Sheng Chang, Taoyuan (TW)

(73) Assignee: DELTA ELECRTONICS, INC., Taoyuan (TW)

( * ) Notice: Subject to any disclaimer, the term of this patent is extended or adjusted under 35 U.S.C. 154(b) by 139 days.

(21) Appl. No.: 16/239,385

(22) Filed: Jan. 3, 2019

(65) Prior Publication Data
    US 2020/0108513 A1   Apr. 9, 2020

(30) Foreign Application Priority Data
    Oct. 8, 2018  (CN) .......................... 2018 1 1168171

(51) Int. Cl.
    *F24H 3/00*     (2006.01)
    *B25J 19/00*    (2006.01)

(52) U.S. Cl.
    CPC ................................. *B25J 19/0054* (2013.01)

(58) Field of Classification Search
    CPC .................................................. B25J 19/0054
    USPC ........................................................ 165/47
    See application file for complete search history.

(56) References Cited

U.S. PATENT DOCUMENTS

| 5,229,576 A * | 7/1993 | Nakao ...................... H05B 3/64 219/390 |
| 2011/0270682 A1* | 11/2011 | Valin ..................... G07F 15/008 705/14.64 |
| 2018/0283722 A1* | 10/2018 | Jung ...................... G05B 15/02 |

FOREIGN PATENT DOCUMENTS

| CN | 207897307 U | 9/2018 |
| TW | I530376 B | 4/2016 |

* cited by examiner

*Primary Examiner* — Davis D Hwu
(74) *Attorney, Agent, or Firm* — Kirton McConkie; Evan R. Witt

(57) ABSTRACT

A heat dissipating system of movable robot is provided. The heat dissipating system includes a movable robot and at least one wind resistance structure. The movable robot includes a housing, at least one airflow passage and plural first air holes. The housing defines an inner space, the airflow passage is disposed in the inner space, and the first air holes are disposed on the housing and are in communication with the airflow passage respectively. When the movable robot moves, an air current is generated accordingly. The air current partially flows into the airflow passage through the first air hole acted as an inlet, and the air current in the airflow passage is released from the first air hole acted as an outlet. The wind resistance structure is configured for guiding the air current into the first air hole acted as the inlet.

10 Claims, 7 Drawing Sheets

1

HEAT DISSIPATING SYSTEM OF MOVABLE ROBOT

CROSS-REFERENCE TO RELATED APPLICATION

This application claims priority to China Patent Application No. 201811168171.X, filed on Oct. 8, 2018, the entire content of which is incorporated herein by reference for all purposes.

FIELD OF THE DISCLOSURE

The present disclosure relates to a heat dissipating system, and more particularly to a heat dissipating system of movable robot.

BACKGROUND OF THE DISCLOSURE

Nowadays, robots have been extensively applied. Robots usually have rotating joints for moving and operating, and the joints are driven by motors. Since the inner space of the robot is relatively sealed, it is hard to naturally dissipate the heat generated by the rotation of joints and the operation of motors. Therefore, the heat is accumulated, and the over-accumulated heat may affect the operation of the robot. Consequently, it is important to dissipate the heat in the inner space of the robot for keeping the robot operating normally.

For dissipating the heat of the inner space of the robot, the prior cooling technique disposes a metal heat conductor between the internal elements (e.g., motor) of the robot and the housing. A heat sink is disposed on the housing so as to enhance of the efficiency of heat dissipation. However, since the metal heat conductor is disposed between the internal elements and the housing, the distribution of the elements inside the robot is affected, and the design complicacy is increased. Moreover, the heat sink is applied for natural heat dissipation. If there is no gas source set up for cooling, the efficiency of heat dissipation can't be enhanced obviously.

Therefore, there is a need of providing a heat dissipating system of movable robot in order to overcome the above drawbacks.

SUMMARY OF THE DISCLOSURE

An object of the present disclosure provides a heat dissipating system of movable robot. The air current caused by the moving of the movable robot is guided into the airflow passage within the movable robot through the inlet, and the air current in the airflow passage is released from the outlet. Meanwhile, the wind resistance structure is mounted for guiding the air current into the inlet, so as to increase the flow of the air current flowing into the airflow passage. Consequently, the air current caused by the moving of the movable robot is utilized for cooling the inner space of the movable robot, and the efficiency of heat dissipating is enhanced.

In accordance with an aspect of the present disclosure, there is provided a heat dissipating system of movable robot. The heat dissipating system includes a movable robot and at least one wind resistance structure. The movable robot includes a housing, at least one airflow passage and a plurality of first air holes. The housing defines an inner space, the at least one airflow passage is disposed in the inner space, and the plural first air holes are disposed on the housing and are in communication with the corresponding airflow passage respectively. The at least one wind resistance structure is mounted on the housing and is corresponding to the first air hole. When the movable robot moves, an air current is generated accordingly. The air current partially flows into the airflow passage through the first air hole acted as an inlet, and the air current in the airflow passage is released from the first air hole acted as an outlet. The first air hole acts as the inlet for opening toward a moving direction of the movable robot, and the first air hole acts as the outlet for opening backward the moving direction of the movable robot. The wind resistance structure is configured for guiding the air current into the first air hole acted as the inlet.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
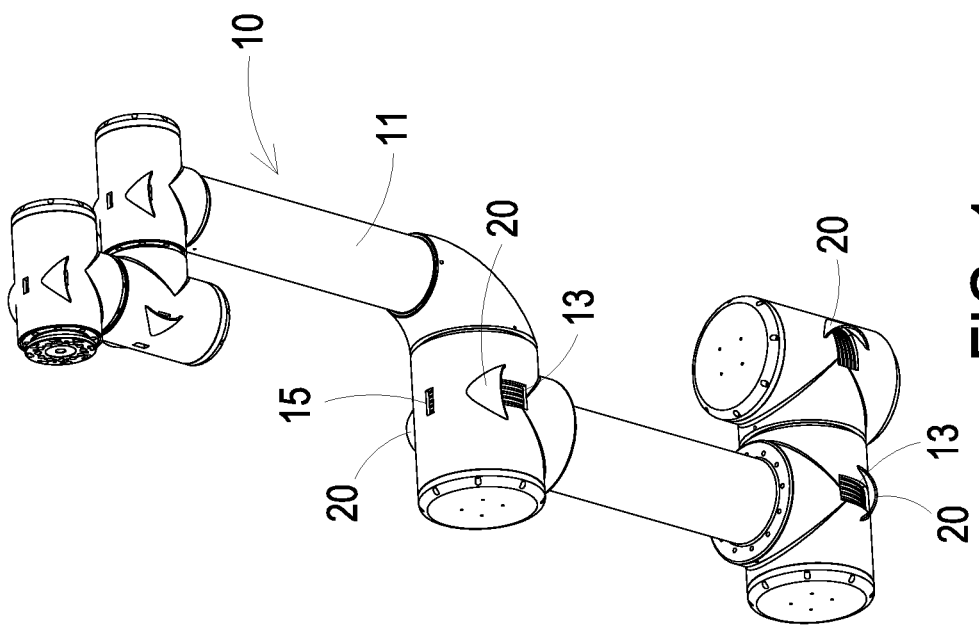
FIG. 1 is a schematic perspective view illustrating a heat dissipating system of a movable robot according to an embodiment of the present disclosure.
Figure 2A:
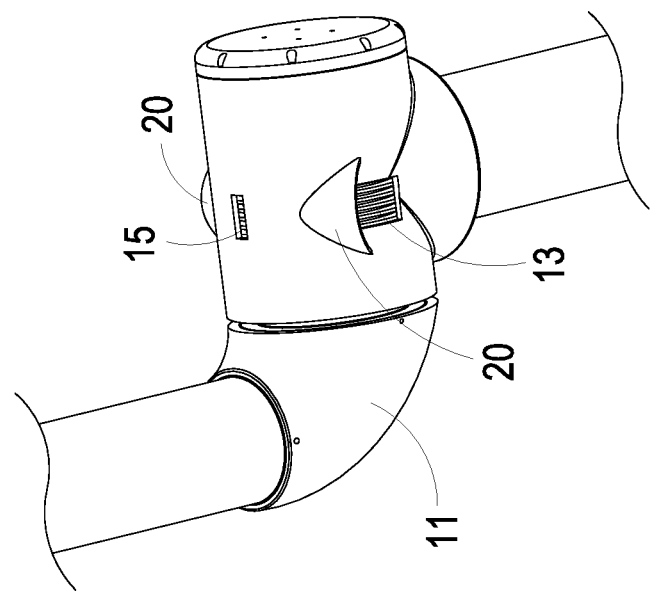
FIG. 2A is a schematic perspective view showing the partial structure of the heat dissipating system of FIG. 1.
Figure 2B:
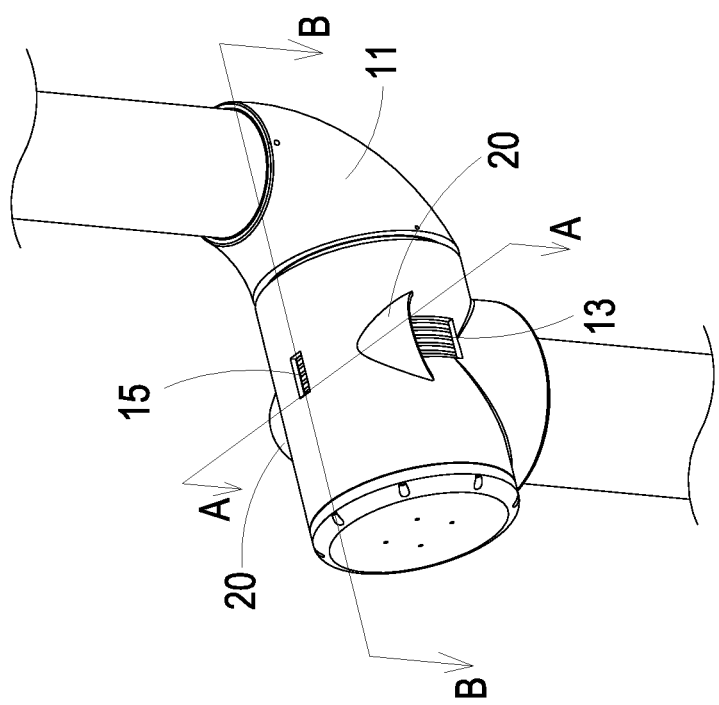
FIG. 2B is a schematic perspective view showing the partial structure in FIG. 2A at another view angle.
Figure 3:
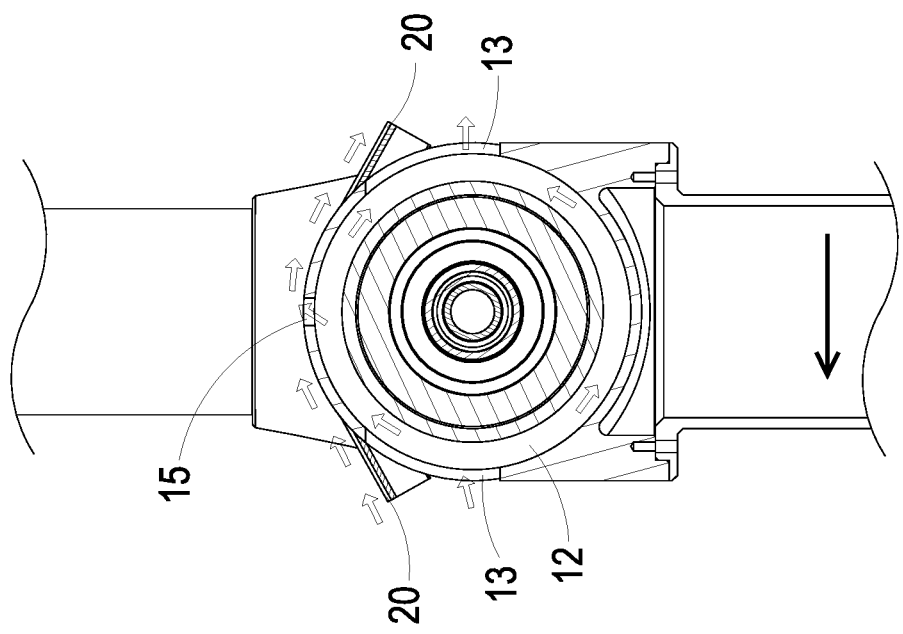
FIG. 3 is a cross-section view taken along the plane A of FIG. 2A.

FIG. 1 is a schematic perspective view illustrating a heat dissipating system of a movable robot according to an embodiment of the present disclosure. FIG. 2A is a schematic perspective view showing the partial structure of the heat dissipating system of FIG. 1. FIG. 2B is a schematic perspective view showing the partial structure in FIG. 2A at another view angle. FIG. 3 is a cross-section view taken along the plane A of FIG. 2A. As shown in FIGS. 1, 2A, 2B and 3, the heat dissipating system 1 of movable robot includes a movable robot 10 and at least one wind resistance structure 20. The movable robot 10 includes a housing 11, at least one airflow passage 12 and a plurality of first air holes 13. The housing 11 defines an inner space 14, and the airflow passage 12 is disposed in the inner space 14. The plural first air holes 13 are disposed on the housing 11, and the plural first air holes 13 are in communication with the corresponding airflow passage 12 respectively. The wind resistance structure 20 is mounted on the housing 11 and is corresponding to the first air hole 13.

When the movable robot 10 moves, the air current is generated accordingly. A part of the air current is guided into the airflow passage 12 through the first air hole 13 acted as an inlet, and the air current in the airflow passage 12 is released from the first air hole 13 acted as an outlet. The inlet is the first air hole 13 opening toward the moving direction of the movable robot 10, and the outlet is the first air hole 13 opening backward the moving direction of the movable robot 10. The wind resistance structure 20 is configured to guide the air current into the first air hole 13 acted as an inlet, so as to increase the flow of the air current flowing into the airflow passage 12.

In fact, each first air hole 13 can be an inlet or an outlet, which depends on the relation between the opening direction of the first air hole 13 and the moving direction of the movable robot 10. If the opening direction of a first air hole 13 is the same with the moving direction of the movable robot 10, the first air hole 13 is an inlet. If the opening direction of a first air hole 13 is opposite to the moving direction of the movable robot 10, the first air hole 13 is an outlet.

Namely, when the movable robot 10 moves, the air current is generated accordingly, and the heat dissipating system 1 guides the air current into the interior of the movable robot 10 for heat dissipation. In order to clearly describe the relation between the moving direction of the movable robot 10 and the flowing path of the air current, FIG. 3 is shown for exemplary description. It is noted that the following locality terms, such as "left" and "right", are defined by the front elevation view of FIG. 3. As shown in FIG. 3, the movable robot 10 moves from right to left, the generated air current flows into the airflow passage 12 through the first air hole 13 at left side and outflows from the first air hole 13 at right side. The first air hole 13 at left side acts as an inlet for opening toward the left, and the first air hole 13 at right side acts as an outlet for opening toward the right.

In addition, as shown in FIG. 1, the moving directions of parts of the movable robot 10 are different, and thus the disposed positions of the first air hole 13 and the wind resistance structure 20 are adjusted according to actual requirements, so as to maximize the flow of the air current flowing into the airflow passage 12. Moreover, as shown in FIGS. 2A and 2B, in this embodiment, one airflow passage 12 is connected with two opposite first air holes 13, and two wind resistance structures 20 are mounted neighboring to the two first air holes 13 respectively. The number of the airflow passage 12, the first air hole 13 and the wind resistance structure 20 corresponding to each other is not limited thereto, and it can be adjusted according to actual requirements.

In an embodiment, the movable robot 10 further includes at least one second air hole 15. The second air hole 15 is disposed on the housing 11 and is located between a pair of the first air holes 13 or a pair of the wind resistance structures 20. The second air hole 15 is in communication with the corresponding airflow passage 12. The external air current path is formed along the two wind resistance structures 20 and the exterior surface of the housing 11 between the two wind resistance structures 20. The external air current path is longer than the airflow passage 12 between the two first air holes 13, and thus the pressure difference between the internal air current and the external air current is generated. Accordingly, the air current in the airflow passage 12 partially outflows from the second air hole 15 due to the pressure difference between the internal air current and the external air current. Therefore, the air current in the airflow passage 12 flows more smoothly, and the flow of the air current in the airflow passage 12 is increased.

Figure 4:
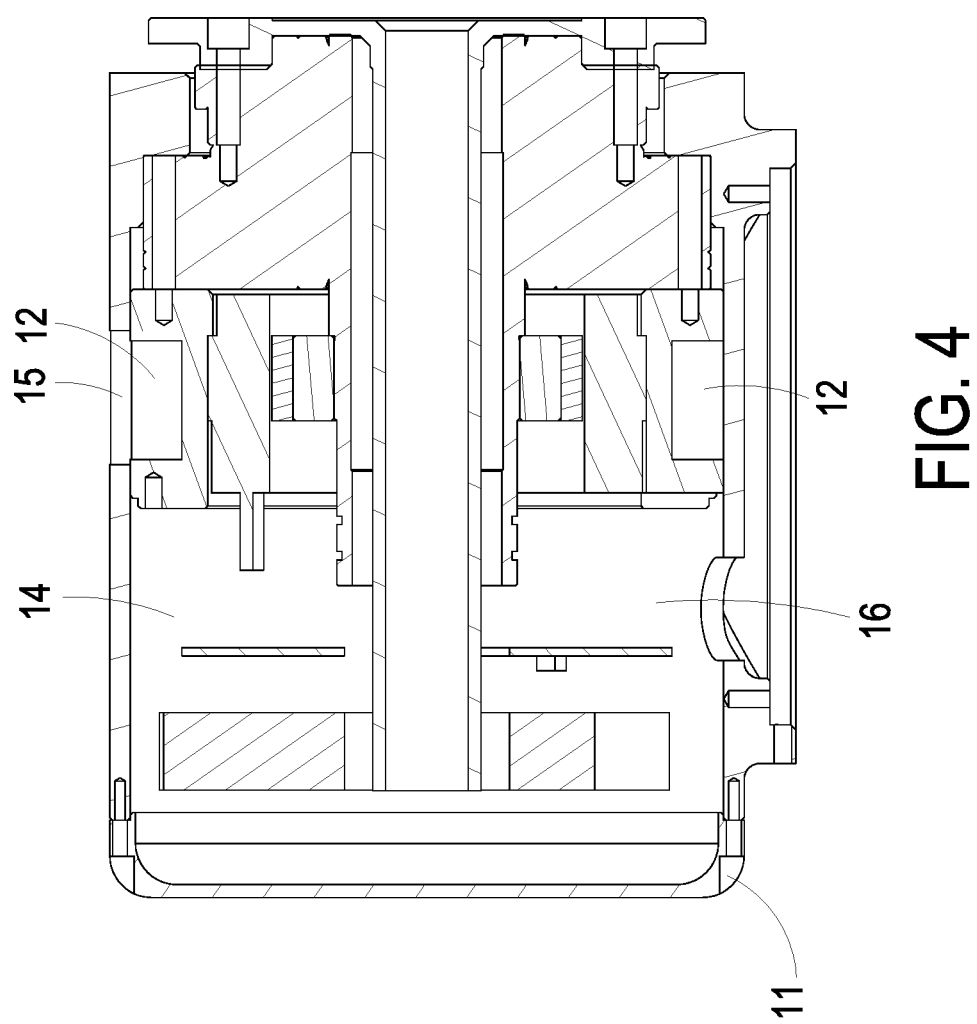
FIGS. 4 and 5 are cross-section views taken along the plane B of FIG. 2A.
Figure 5:
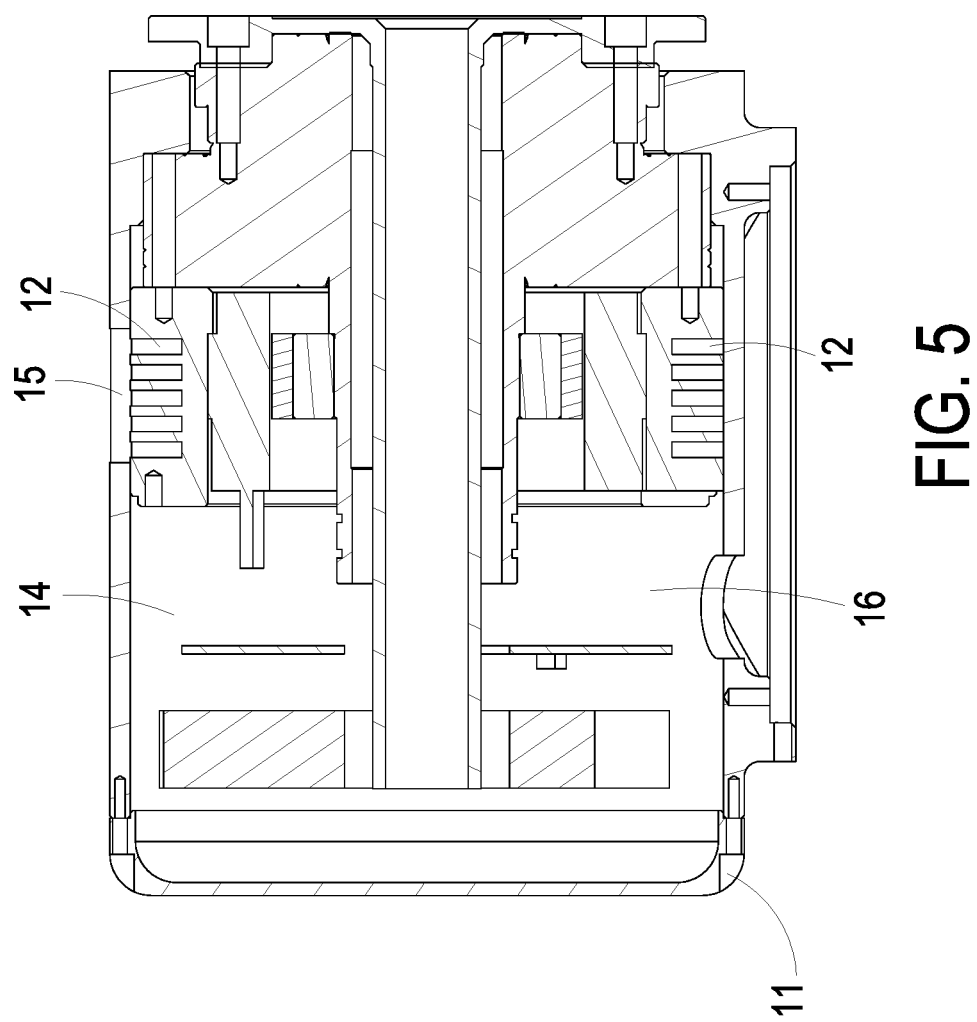

FIGS. 4 and 5 are cross-section views taken along the plane B of FIG. 2A. The shape and structure of the airflow passage 12 can be adjusted according to actual requirements. For example, but not exclusively, the airflow passage 12 is the channel shown in FIG. 4, or the airflow passage 12 is the finned channel shown in FIG. 5 for enhancing the heat dissipating efficiency by increasing the surface area of the airflow passage 12. In an embodiment, the inner space 14 of the movable robot 10 includes an accommodation space 16 configured for accommodating the elements having higher heat dissipation demand (e.g., motor). The airflow passage 12 is disposed closely to the elements having higher heat dissipation demand, or even the elements are surrounded by the airflow passage 12. Therefore, the heat dissipation of specific elements in the inner space 14 is enhanced. It is noted that the first air holes 13, the airflow passage 12 and the second air hole 15 are all isolated from the accommodation space 16, and the air current outside the housing 11 can't flow into the accommodation space 16. Therefore, the characteristic of Ingress Protection of the movable robot 10 is maintained. In an embodiment, the airflow passage 12 is a circular structure, but not exclusively.

Figure 6A:
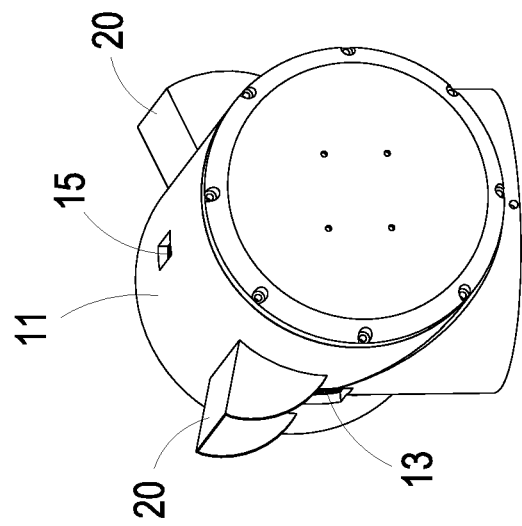
FIGS. 6A and 6B are schematic perspective views showing the partial structure in FIG. 2A according to different embodiments.
Figure 6B:
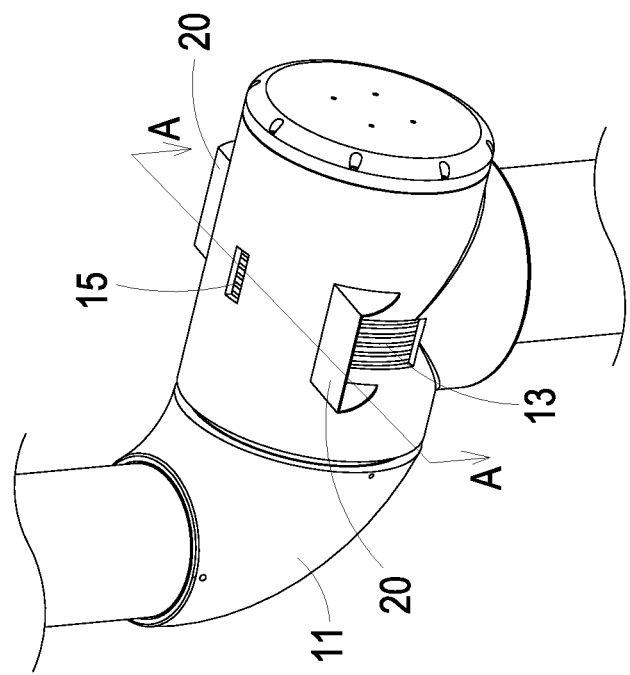
Figure 7:
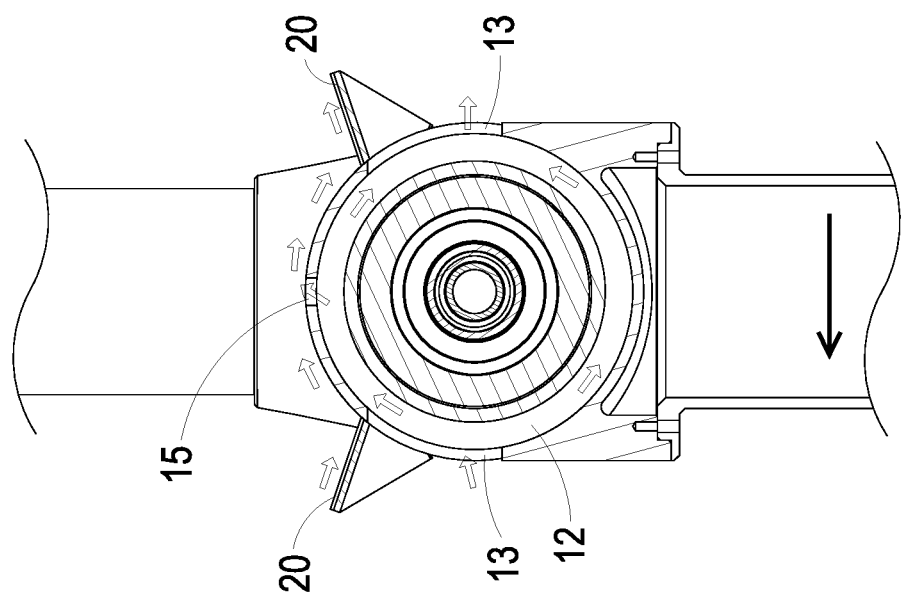
FIG. 7 is a cross-section view taken along the plane A of FIG. 6A.

In addition, the shape and structure of the wind resistance structure 20 are not limited. The wind resistance structure 20 can be any structure being able to result in resistance to the air current caused by the moving of the movable robot 10 and increase the flow of the air current guided into the inlet. In an embodiment, as shown in FIG. 2A, the wind resistance structure 20 is an arc shelter. In an embodiment, as shown in FIGS. 6A, 6B and 7, the wind resistance structure 20 is a square shelter. The angle of the wind resistance structure 20 relative to the housing 11 and the range of the wind resistance structure 20 covering the first air hole 13 are adjustable. The actual type of the wind resistance structure 20 is not limited to that in the above examples. The shape and structure of the wind resistance structure 20 or even the angle of the wind resistance structure 20 relative to the housing 11 can be adjusted according to actual requirements, so as to optimize the wind area and the flow of inlet air.

From the above descriptions, the present disclosure provides a heat dissipating system of movable robot. The air current caused by the moving of the movable robot is guided into the airflow passage within the movable robot through the inlet, and the air current in the airflow passage is released from the outlet. Meanwhile, the wind resistance structure is mounted for guiding the air current into the inlet, so as to increase the flow of the air current flowing into the airflow passage. Consequently, the air current caused by the moving of the movable robot is utilized for cooling the inner space of the movable robot, and the efficiency of heat dissipating is enhanced. In addition, the external air current path is formed along the exterior surface of the housing between two wind resistance structures. The external air current path is longer than the airflow passage between two first air holes, and the pressure difference between the internal air current and the external air current is generated. Accordingly, the air current in the airflow passage partially outflows from the second air hole due to the pressure difference between the internal air current and the external air current. Therefore, the air current in the airflow passage flows more smoothly, and the flow of the air current in the airflow passage is increased.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A heat dissipating system, comprising:
    a movable robot comprising a housing, at least one airflow passage and a plurality of first air holes, wherein the housing defines an inner space, the at least one airflow passage is disposed in the inner space, and the plural first air holes are disposed on the housing and are in communication with the corresponding airflow passage respectively; and
    at least one wind resistance structure mounted on the housing and corresponding to the first air hole,
    wherein when the movable robot moves, an air current is generated accordingly, the air current partially flows into the airflow passage through the first air hole acted as an inlet, the air current in the airflow passage is released from the first air hole acted as an outlet, the first air hole acts as the inlet for opening toward a moving direction of the movable robot, the first air hole acts as the outlet for opening backward the moving direction of the movable robot, and the wind resistance structure is configured for guiding the air current into the first air hole acted as the inlet.

2. The heat dissipating system according to claim 1, wherein the movable robot further comprises at least one second air hole, the second air hole is disposed on the housing and is in communication with the corresponding airflow passage, and the air current in the airflow passage is partially released from the second air hole.

3. The heat dissipating system according to claim 1, wherein an external air current path is formed along two wind resistance structures and the housing between the two wind resistance structures, and the external air current path is longer than the airflow passage between two first air holes.

4. The heat dissipating system according to claim 1, wherein each of the plural first air holes acts as the inlet or the outlet according to the moving direction of the movable robot.

5. The heat dissipating system according to claim 1, wherein the first air holes and the wind resistance structure are disposed corresponding to the moving direction of the movable robot.

6. The heat dissipating system according to claim 1, wherein the wind resistance structure is an arc shelter or a square shelter.

7. The heat dissipating system according to claim 1, wherein the airflow passage is finned.

8. The heat dissipating system according to claim 1, wherein the airflow passage is a circular structure.

9. The heat dissipating system according to claim 1, wherein the inner space includes an accommodation space configured for accommodating elements having high heat dissipation demand, the accommodation space is isolated from the first air holes, the airflow passage and the second air hole, and the airflow passage is disposed neighboring to the elements having high heat dissipation demand.

10. The heat dissipating system according to claim 1, wherein each of the at least one airflow passage is connected with two opposite first air holes, and two wind resistance structures are disposed neighboring to the two opposite first air holes respectively.

* * * * *